United States Patent
Davis, Jr.

(10) Patent No.: US 6,799,785 B1
(45) Date of Patent: Oct. 5, 2004

(54) GLOVE BOX DOOR DAMPING DEVICE

(75) Inventor: Joseph J Davis, Jr., Ortonville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/605,728

(22) Filed: Oct. 22, 2003

(51) Int. Cl.$^7$ ................................................ B60N 3/12
(52) U.S. Cl. ...................... 296/37.12; 49/386; 16/303
(58) Field of Search ............................ 296/37.12, 37.8; 49/386; 16/303

(56) References Cited

U.S. PATENT DOCUMENTS

| | | | | |
|---|---|---|---|---|
| 4,596,416 A | * | 6/1986 | Muller ..................... | 296/37.12 |
| 4,886,311 A | | 12/1989 | Trube et al. ............. | 292/37.12 |
| 5,292,159 A | | 3/1994 | Sandhu et al. ........... | 292/173 |
| 5,385,378 A | | 1/1995 | Hakamada et al. ...... | 296/37.12 |
| 5,823,583 A | | 10/1998 | Sandhu et al. ........... | 292/173 |
| 5,868,448 A | | 2/1999 | Izumo ....................... | 296/37.1 |
| 5,951,083 A | * | 9/1999 | Bittinger et al. ......... | 296/37.12 |
| 6,076,878 A | * | 6/2000 | Isano ........................ | 296/37.12 |
| 6,131,242 A | * | 10/2000 | Zipperle et al. .......... | 16/82 |
| 6,152,501 A | | 11/2000 | Magi et al. ............... | 292/336.3 |
| 6,152,512 A | * | 11/2000 | Brown et al. ............. | 296/37.12 |
| 6,206,442 B1 | * | 3/2001 | Breunig ................... | 296/37.12 |
| 6,244,647 B1 | * | 6/2001 | Allison ..................... | 296/37.12 |
| 6,601,897 B2 | * | 8/2003 | Stelandre et al. ........ | 396/37.12 |
| 2002/0171248 A1 | | 11/2002 | Diss et al. ................ | 292/164 |

* cited by examiner

*Primary Examiner*—Stephen Gordon
(74) *Attorney, Agent, or Firm*—Bill C Panagos

(57) ABSTRACT

A glove box damper device is disclosed having a cam rotationally moving against a spring to slow the descent of glove box lid during opening. The glove box damper device is easy to install, has reduced costs over many previous damper devices and reduces breakage. The glove box damper is suitable for use with glove box lids having a sheet metal insert to meet automotive safety requirements.

20 Claims, 3 Drawing Sheets

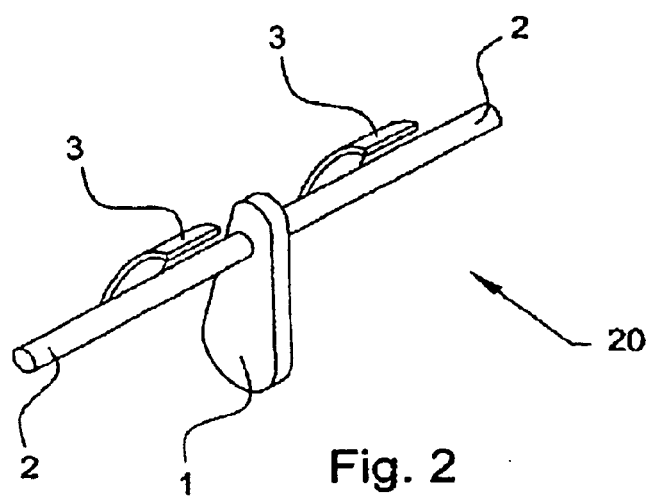
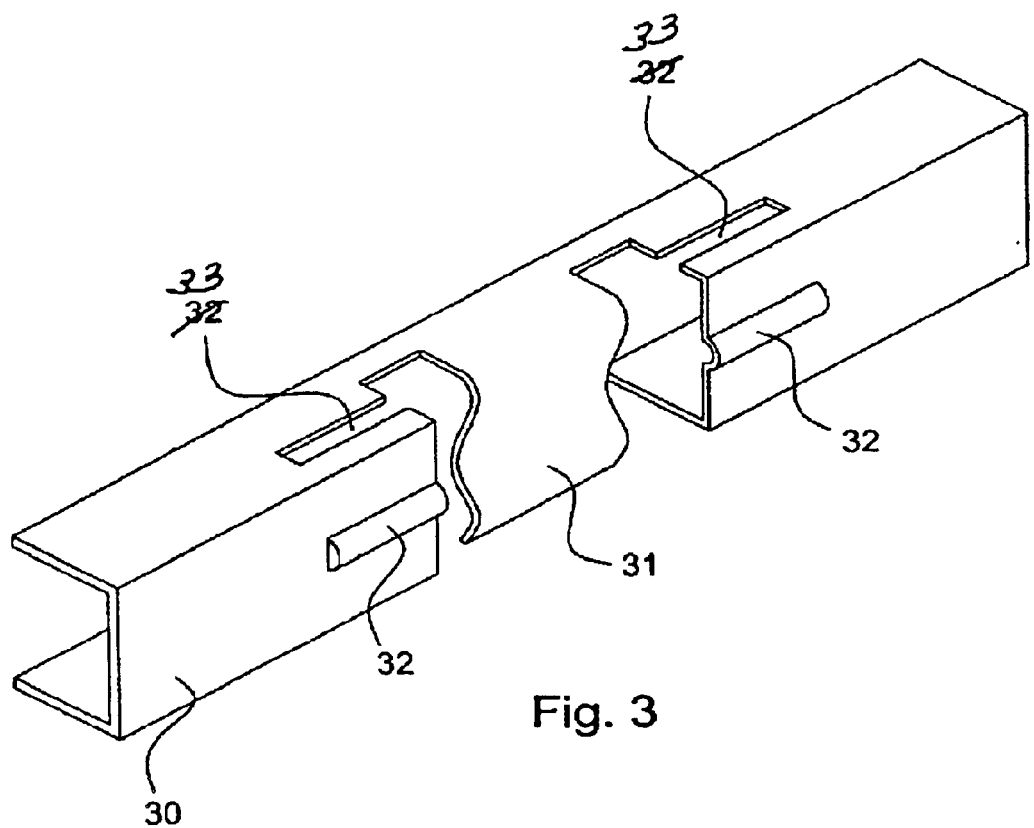

GLOVE BOX DOOR DAMPING DEVICE

BACKGROUND OF INVENTION

1. Field of the Invention

The present invention relates in general to a damper mechanism for vehicle glove boxes and particularly to a damper mechanism which is utilizes a cam deflected spring to damp the downward movement of the glove box lid.

2. Description of the Related Art

In order to improve the feel of smoothness and quality while opening a glove box door, various damping devices have been employed. Such devices include elaborate assemblies of springs, pistons, cams, cables and numerous other arrangements for slowing the descent of the glove box door as it is opened. This is especially desired in the current glove box doors which require a sheet metal liner to meet safety standards.

For example, U.S. Pat. No. 4,886,311 issued Dec. 12, 1989 to Trube et al. teaches a glove box lock mechanism mounted in the dash panel.

U.S. Pat. No. 5,292,159 issued Mar. 8, 1994 to Sandhu et al. teaches a flush mounted door latching mechanism for use with glove boxes.

U.S. Pat. No. 5,385,378 issued Jan. 31, 1995 to Hakamada et al. teaches a glove box opening system that allows the glove box door to be opened further than the normal use position to allow access to the interior area of the dash board for servicing air conditioning or air bag units.

U.S. Pat. No. 5,823,583 issued Oct. 20, 1998 to Sandhu et al. teaches a simplified three piece glove box latching mechanism.

U.S. Pat. No. 5,868,448 issued Feb. 9, 1999 to Izumo teaches a glove box lid which opens upward instead of downward and a tensioning means to allow the raised glove box lit to remain open until forced downward by the user.

U.S. Pat. No. 5,591,083 issued Sep. 14, 1999 to Bittinger et al. teaches damping a glove box door's movement using a compressible rubber wheel.

U.S. Pat. No. 6,152,501 issued Nov. 28, 2000 to Magi et al. teaches a glove box door handle and latch assembly having a mounted door latch that is flush with the exterior door panel.

U.S. Patent Application Publication Number 2002/0171248 published Nov. 21, 2002 to Diss et al. teaches a glove box latching assembly having a handle mounted flush with the exterior door panel.

Thus there is still a need for an efficient, easy to assembly, cost effective, reduced breakage glove box door damping device.

DISCLOSURE OF THE INVENTION

The present invention provides advantages and alternatives over the prior art by providing a glove box damping assembly which may be molded-in reducing the manufacturing and assembly costs.

According to a further aspect of the present invention, there is provided a glove box damper comprising: a cam assembly comprising a cam lobe attached substantially perpendicular to a pair of mounting spindles and at least two brackets for mounting said cam assembly along the bottom edge of a glove box lid, said glove box lid mounted along its lower edge to a glove box bin allowing said glove box lid to open in a downward direction; a spring assembly comprising body having an integral spring against which said cam lobe is biased and a pair of spindle mounting slots for positioning said cam assembly, mounted on an instrument panel retainer, thereby providing a damping of the downward opening movement of said glove box lid.

According to yet another aspect of the present invention there is provided A glove box damper comprising: a cam assembly comprising a cam lobe attached substantially perpendicular to a pair of mounting spindles and at least two brackets for mounting said cam assembly along the bottom edge of a glove box lid, said glove box lid mounted along its lower edge to a glove box bin allowing said glove box lid to open in a downward direction; a spring assembly comprising body having an integral spring against which said cam lobe is biased and having a shape stopping the travel of the cam at a desired point, and a pair of spindle mounting slots for positioning said cam assembly, mounted on an instrument panel retainer, thereby providing a damping of the downward opening movement of said glove box lid as well as a desired amount of travel of said glove box lid.

The present invention thus advantageously provides a glove box damper device which is easy to assembly, cost effective, has reduced breakage, and which provides a sense of smooth operation and quality construction to the user.

BRIEF DESCRIPTION OF DRAWINGS

FIG. 2 shows a perspective view of the cam portion of the glove box damper device of the present invention.

FIG. 3 shows a perspective view of the spring portion of the glove box damper of the present invention

DETAILED DESCRIPTION

Figure 1:
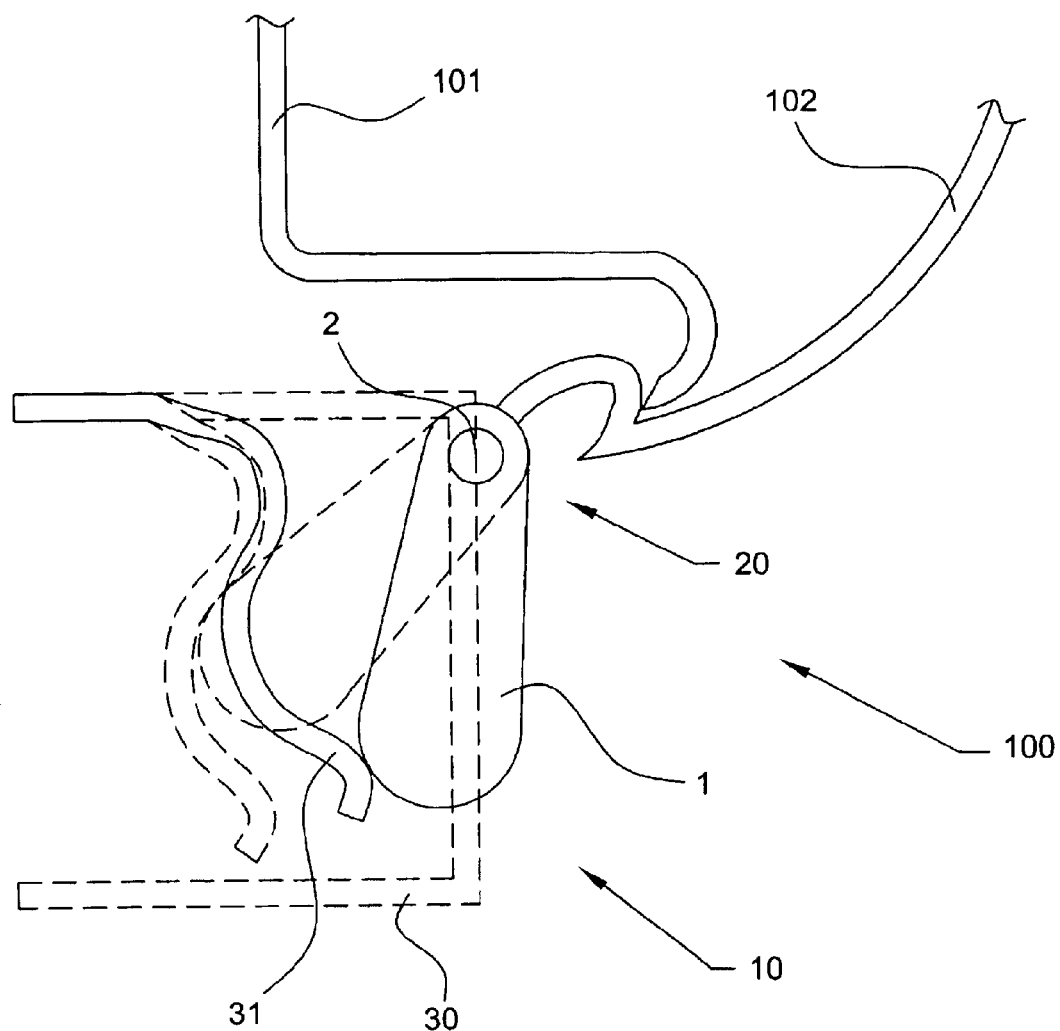
FIG. 1 shows an exploded sectional partial side plan view of the glove box damper device of the present invention.

Reference will now be made to the drawings, wherein to the extent possible like reference numerals are utilized to designate like components throughout the various views. Referring to FIG. 1, there is presented an exploded sectional partial plan view of a glove box assembly 100 having the damper device 10 of the present invention. The glove box assembly 100 comprising a glove box body or shell 101 and a glove box lid 102 as is typically mounted in a vehicle.

As further shown in FIG. 1 the damper device 10 comprises a cam assembly 20 mounted on or molded into the glove box lid 102 and a spring portion 31 mounted on or molded into the I P retainer 30.

Referring now to FIG. 2, there is shown a perspective view of the cam assembly 20 having a cam lobe 1, a pair of mounting spindles 2 and a pair of mounting brackets 3. In practice the mounting spindles 2 are rotatively mounted in retaining slots 32 (FIG. 3) of instrument panel retainer 30

(FIG. 3). The cam lobe 1 being substantially perpendicular to mounting spindles 2. The mounting brackets 3 are fixedly attached to the glove box lid 102 (FIG. 1).

Turning now to FIG. 3, there is shown the instrument panel retainer 30 having a spring 31 of desired shape molded therein and further having molded therein a pair of retaining slots 32 configured to receive a corresponding pair of mounting spindles 2 (FIG. 2) of the cam assembly 20 (FIG. 2) of the present invention. The spindles 2 (FIG. 2) mounted in the retaining slots 32 position the cam 1 (FIG. 2) to ride against spring 31. Also shown are mounting slots 33 which provide for easy insertion of the mounting spindles 2 (FIG. 2) into the retaining slots 32. During the downward opening movement of the glove box lid 102 (FIG. 1) the spring 31 thus exerts a desired force against the rotational movement of cam 1 (FIG. 2) thereby damping and slowing the downward movement of the glove box lid 102 (FIG. 1). The spring 31 may also be configured to stop the rotational movement of the cam 1 (FIG. 2) at a predetermined point thereby limiting the opening travel of the glove box lid 102 (FIG. 1).

Figure 4:
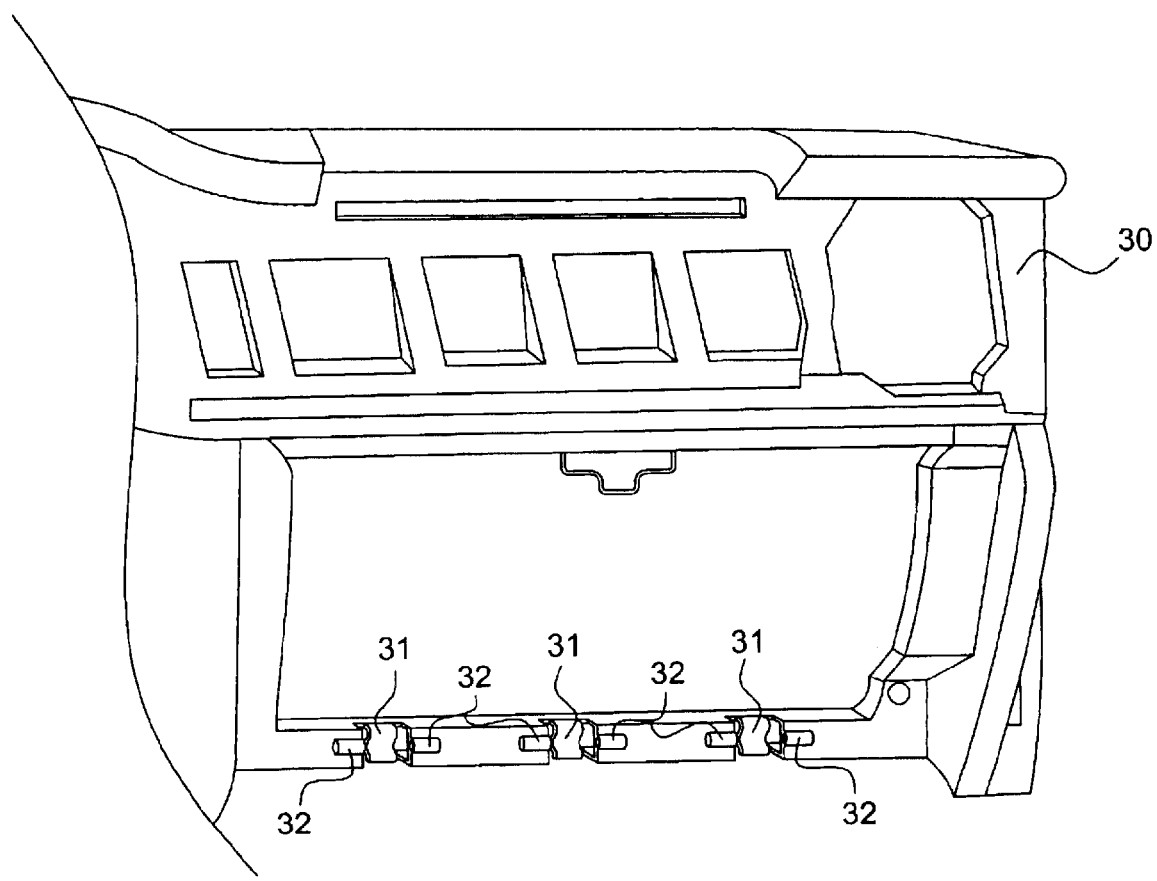
FIG. 4 shows a plan front view of a portion of an instrument panel retainer containing a glove box opening having the springs and retaining slots for the damper device of the present invention.

Referring now to FIG. 4 there is shown a partial front plan view of an instrument panel retainer 30 having molded therein a plurality of springs 31 and corresponding plurality of paired retaining slots 32 of the present invention.

The combination of a cam 1 rotating against a spring 31 results in a resistance to downward movement of the glove box lid 102 thereby giving a passenger operating the glove box a feeling of smooth operation combined with close fitting and accurate quality construction. At the same time this damper device assists in eliminating the sense of weight in the glove box lid 102 again providing a feeling of smooth operation and quality construction.

In practice it is preferred for the spring to be about 30% to about one third compressed from its free position when the glove box lid is closed and about one half 50% compressed from its free position when the glove box lid is open. Different amounts of compression on the spring at both the open and closed positions of the glove box lid may be used to provide the desired effect of damping and slowing of the glove box lid travel.

The damper device 10 of the present invention may be made of any suitable material or materials well known in this art. Particularly the damper device 10 of the present invention may be made of the same material at that of the instrument panel retainer or it may be made of a different material to achieve the desired properties of providing damping and slowing of the glove box lid during opening. Presently preferred materials include, for example, acrylonitrile-butadiene-styrene (ABS), polycarbonate/acrylonitrile-butadiene-styrene (PC/ABS), the engineered material sold under the brand name NOREL by General Electric Corporation, polypropylene, and other engineered materials well known in this art. It is also to be understood that the various parts of the damper device of the present invention may all be made of the same material or the various parts may of different materials.

Although the preferred embodiments of the present invention has been disclosed in connection with one particular example, those skilled in the art will appreciate that various changes and modifications may be made without departing from the scope of the invention as set forth in the appended claims.

What is claimed is:

1. A glove box damper comprising:
   a cam assembly comprising a cam lobe attached substantially perpendicular to a pair of mounting spindles and at least two brackets for mounting said cam assembly along the bottom edge of a glove box lid, said glove box lid mounted along its lower edge to a glove box bin allowing said glove box lid to open in a downward direction;
   a spring assembly comprising a body having an integral spring against which said cam lobe is biased and a pair of spindle mounting slots for positioning said cam assembly, mounted on an instrument panel retainer;
   thereby providing a damping of the downward opening movement of said glove box lid.

2. A glove box damper as claimed in claim 1, wherein said cam assembly is molded of an engineered material selected from the group comprising but not limited to ABS, PC/ABS, and polypropylene.

3. A glove box damper as claimed in claim 1, wherein said cam assembly is molded as an integral part of said glove box lid.

4. A glove box damper as claimed in claim 1, wherein said cam assembly is molded as a separate unit fixedly attached to said glove box lid.

5. A glove box damper as claimed in claim 1, wherein said cam assembly cam lobe comprises a material different from the material comprising the rest of said cam assembly.

6. A glove box damper as claimed in claim 1, wherein said spring assembly is molded of an engineered material selected from the group comprising but not limited to ABS, PC/ABS, and polypropylene.

7. A glove box damper as claimed in claim 1, wherein said spring assembly is molded as an integral part of said instrument panel retainer.

8. A glove box damper as claimed in claim 1, wherein said spring assembly is molded as a separate unit fixedly attached to said instrument panel retainer.

9. A glove box damper as claimed in claim 1, wherein said spring assembly spring comprises a material different from the material comprising the rest of said spring assembly.

10. A glove box damper as claimed in claim 1, wherein said spring is compressed about 30% of a free position when said glove box lid is in a closed position and said spring is compressed about 50% of said free position when said glove box lid is in an open position.

11. A glove box damper comprising:
    a cam assembly comprising a cam lobe attached substantially perpendicular to a pair of mounting spindles and at least two brackets for mounting said cam assembly along the bottom edge of a glove box lid, said glove box lid mounted along its lower edge to a glove box bin allowing said glove box lid to open in a downward direction;
    a spring assembly comprising a body having an integral spring against which said cam lobe is biased and having a shape stopping the travel of the cam lobe at a desired point, and a pair of spindle mounting slots for positioning said cam assembly, mounted on an instrument panel retainer, thereby providing a damping of the downward opening movement of said glove box lid as well as a desired amount of travel of said glove box lid.

12. A glove box damper as claimed in claim 11, wherein said cam assembly is molded of an engineered material selected from the group comprising but not limited to ABS, PC/ABS, and polypropylene.

13. A glove box damper as claimed in claim 11, wherein said cam assembly is molded as an integral part of said glove box lid.

14. A glove box damper as claimed in claim 11, wherein said cam assembly is molded as a separate unit fixedly attached to said glove box lid.

15. A glove box damper as claimed in claim 11, wherein said cam assembly cam lobe comprises a material different from the material comprising the rest of said cam assembly.

16. A glove box damper as claimed in claim 11, wherein said spring assembly is molded of an engineered material selected from the group comprising but not limited to ABS, PC/ABS, and polypropylene.

17. A glove box damper as claimed in claim 11, wherein said spring assembly is molded as an integral part of said instrument panel retainer.

18. A glove box damper as claimed in claim 11, wherein said spring assembly is molded as a separate unit fixedly attached to said instrument panel retainer.

19. A glove box damper as claimed in claim 11, wherein said spring assembly spring comprises a material different from the material comprising the rest of said spring assembly.

20. A glove box damper as claimed in claim 11, wherein said spring is compressed about 30% of a free position when said glove box lid is in a closed position and said spring is compressed about 50% of said free position when said glove box lid is in an open position.

* * * * *